United States Patent
Karabetsos

(10) Patent No.: US 8,117,837 B1
(45) Date of Patent: Feb. 21, 2012

(54) HYDROSTATIC TRANSMISSION HAVING INTEGRATED PRESSURE COMPENSATED LOAD SENSING AUXILIARY PUMP

(75) Inventor: Jeffrey J. Karabetsos, Ankeny, IA (US)

(73) Assignee: Sauer-Danfoss Inc., Ames, IA (US)

( * ) Notice: Subject to any disclaimer, the term of this patent is extended or adjusted under 35 U.S.C. 154(b) by 1630 days.

(21) Appl. No.: 10/738,774

(22) Filed: Dec. 17, 2003

(51) Int. Cl.
*F16D 31/02* (2006.01)
(52) U.S. Cl. .......................................... 60/422
(58) Field of Classification Search ............ 60/422
See application file for complete search history.

(56) References Cited

U.S. PATENT DOCUMENTS

| | | | |
|---|---|---|---|
| 3,196,696 A | 7/1965 | Ritter | |
| 4,262,768 A | 4/1981 | Itatani et al. | |
| 4,405,287 A * | 9/1983 | Kuchenbecker et al. | 60/452 |
| 4,454,716 A * | 6/1984 | Rau | 60/422 |
| 4,658,662 A | 4/1987 | Rundle | |
| 4,759,183 A * | 7/1988 | Kreth et al. | 60/422 |
| 4,778,349 A | 10/1988 | Browning | |
| 4,866,936 A * | 9/1989 | Ohashi et al. | 60/422 |
| 5,069,037 A * | 12/1991 | Sakigawa et al. | 60/435 |
| 5,226,497 A | 7/1993 | Beaton | |
| 5,339,906 A | 8/1994 | Fox et al. | |
| 5,542,307 A * | 8/1996 | Hasegawa et al. | 74/720 |
| 5,755,098 A | 5/1998 | Irikura | |
| 6,199,380 B1 * | 3/2001 | Ishii | 60/487 |
| 2002/0033093 A1* | 3/2002 | Nemoto | 92/71 |

* cited by examiner

*Primary Examiner* — Daniel Lopez
(74) *Attorney, Agent, or Firm* — Zarley Law Firm, P.L.C.

(57) ABSTRACT

A hydrostatic transmission using a hydrostatic pump, a hydrostatic motor, and a pressure compensating load sensing auxiliary pump. The hydrostatic pump is fluidly connected to the hydrostatic motor using fluid lines and a center section. The hydrostatic pump additionally has an input shaft that drives the hydrostatic pump to provide the hydrostatic motor with power. Additionally, the pressure compensating load sensing auxiliary pump is in line with the hydrostatic pump and is rotated with the input shaft. This configuration allows the input shaft to operate the power takeoff (PTO) shaft while the hydrostatic motor output shaft operates the axles of a vehicle via a differential.

6 Claims, 2 Drawing Sheets

HYDROSTATIC TRANSMISSION HAVING INTEGRATED PRESSURE COMPENSATED LOAD SENSING AUXILIARY PUMP

BACKGROUND OF THE INVENTION

This invention relates to a hydrostatic transmission that has integrated within it a pressure compensated load sensing auxiliary pump. More specifically, and without limitation this invention relates to a hydrostatic transmission that has a pressure compensated load sensing auxiliary pump integrated along the input shaft of the hydrostatic pump in order to improve upon the art.

Small tractors, under 80 horsepower, usually incorporate hitch valves, auxiliary valves and external gear pumps. This system configuration causes excess gear pumps and plumbing. More elaborate valve designs are necessary to allow the system to function. Furthermore, the gear pumps in combination with the valves can be unreliable, lack durability, and increase the parasitic power loss.

Thus, it is a primary object of the present invention to provide a hydrostatic transmission with an integrated pressure compensated load sensing auxiliary pump that improves upon the state of the art.

Another object of the present invention is to allow for simplified valve designs and to reduce total system parasitic power loss.

A further object of the present invention is to eliminate excess gear pumps.

Another object of the present invention is to reduce the overall system plumbing.

Yet a further object of the present invention is to improve a hydrostatic transmission's reliability and durability.

These and other objects, features, or advantages of the present invention will become apparent from the specification and claims.

BRIEF SUMMARY OF THE INVENTION

The present invention is a hydrostatic transmission that incorporates a pressure compensated load sensing auxiliary pump. The input shaft of the hydrostatic transmission is able to drive both the hydrostatic pump, the pressure compensated load sensing pump, and the power takeoff shaft. Simultaneously, the hydrostatic pump is fluidly connected to the hydrostatic motor and drives the motor having an output shaft. The output shaft is then used to drive a differential that rotates the axle connected to the wheels of a vehicle. The entire transmission, differential, power takeoff shaft, and axles are housed within a transmission housing.

DESCRIPTION OF THE PREFERRED EMBODIMENTS OF THE INVENTION

Figure 1:
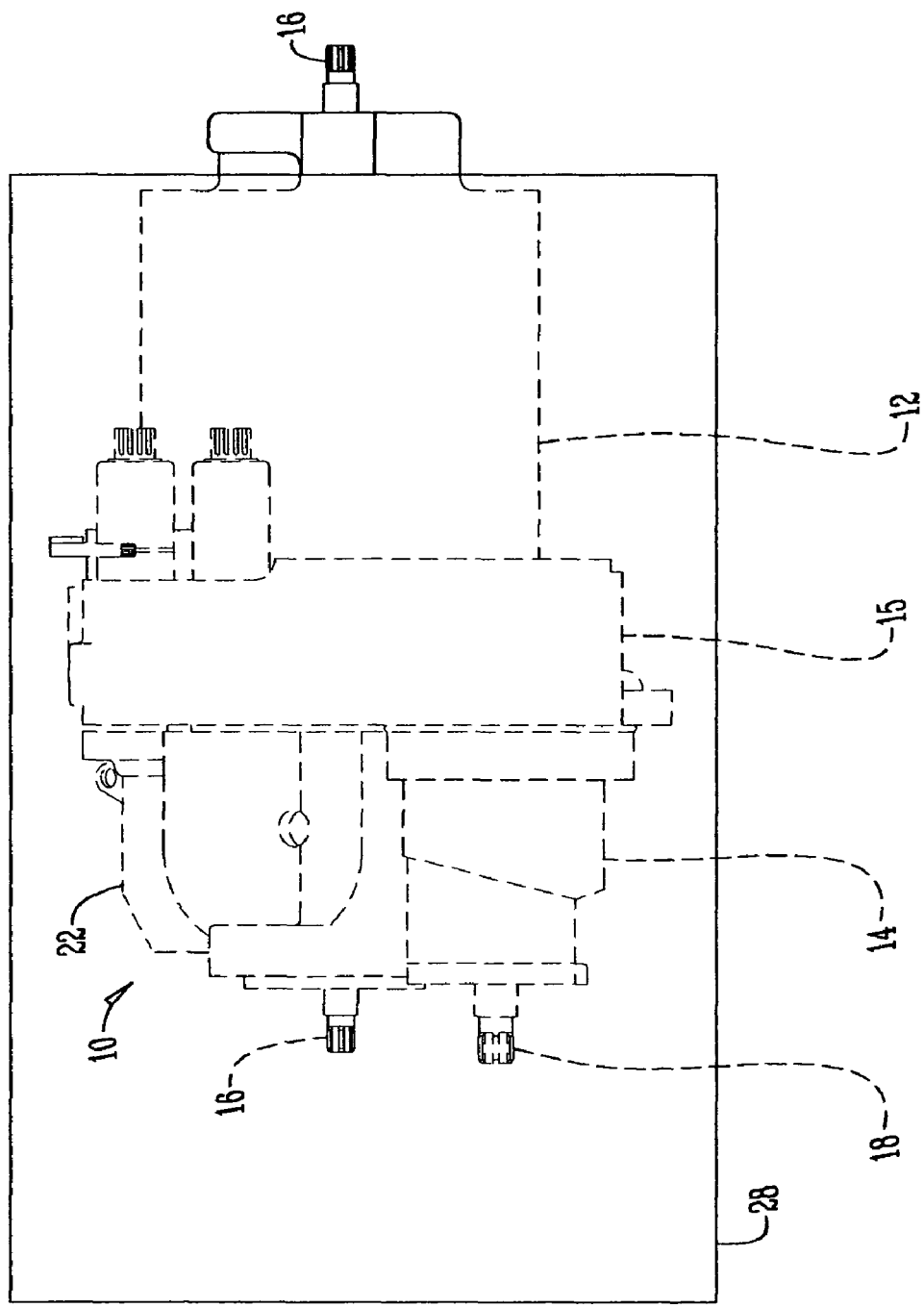
FIG. 1 is a side view of the hydrostatic transmission within the tractor transmission case using hidden lines.
Figure 2:
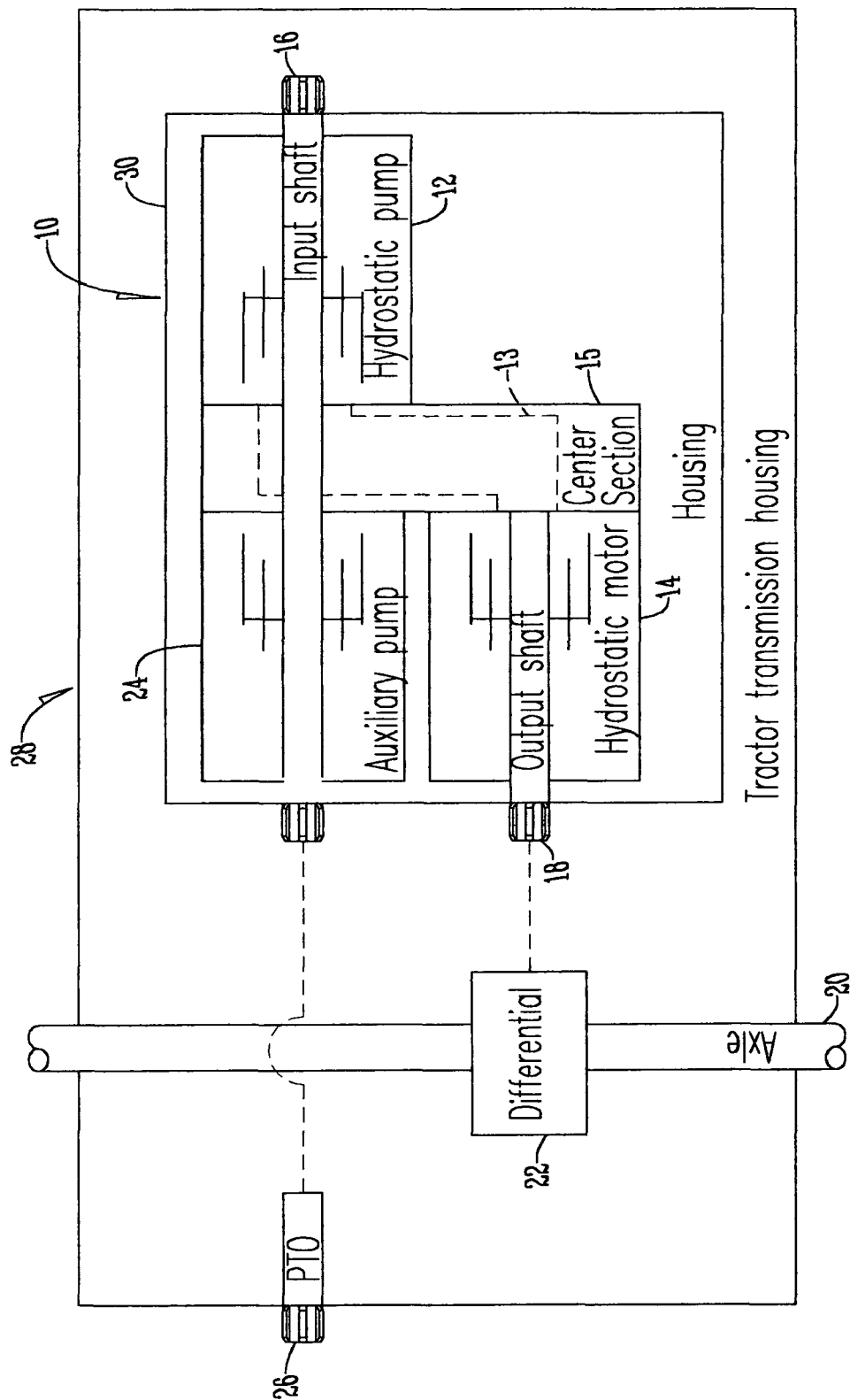
FIG. 2 is schematic of the hydrostatic transmission of this system.

FIGS. 1 and 2 of the present invention show a side view and a schematic view of the hydrostatic transmission 10 of the present invention. Hydrostatic transmission 10 has a hydrostatic pump 12 that has fluid lines 13 that connect to the hydrostatic motor 14 via center section 15. The hydrostatic pump 12 has an input shaft 16. Hydrostatic motor 14 has an output shaft 18 that actuates axle 12 using differential 22. Input shaft 16 runs through hydrostatic pump 12 pressure compensating load sensing auxiliary pump 24 and to power takeoff (PTO) shaft 26. The entire system is encased by tractor transmission housing 28 though it should be appreciated that any vehicle could incorporate this system. For extra protection the hydrostatic pump 12, hydrostatic motor 14, pressure compensating load sensing auxiliary pump 24, and center section 15 can be encompassed by a hydrostatic housing 30.

In operation, input shaft 16 drives both pressure compensated load sensing auxiliary pump 24 and hydrostatic transmission pump 12. Hydrostatic transmission pump 12 then controls hydrostatic motor 14, which drives differential 24 and tractor axle 20. Further, the auxiliary pump 24 is mounted on the center section 15 adjacent the hydrostatic motor 14 directly opposite the hydrostatic transmission pump 12 allowing the input shaft 16 to drive both pumps 12, 24 simultaneously as well as providing through power to the PTO shaft 26.

The present invention incorporates a pressure compensated load sensing auxiliary pump thus eliminating gear pumps, reducing overall system plumbing and improving system efficiency, reliability, and durability. The invention allows for more simplified valve designs and reduces total system parasitic power loss. It should also be appreciated that because of the reduction of parts and plumbing, this complete transmission package is less expensive to make compared to prior art transmissions. Therefore the present invention achieves all of its objectives.

It will be appreciated by those skilled in the art that other various modifications could be made to the device without the parting from the spirit in scope of this invention. All such modifications and changes fall within the scope of the claims and are intended to be covered thereby.

What is claimed is:

1. Hydrostatic transmission comprising:
a pump having a centerline of rotation;
a motor fluidly connected to the pump via fluid lines within a center section;
an input shaft rotatably connected to the pump so that the input shaft rotates the pump; and
a pressure compensating load sensing auxiliary pump rotatably connected to the input shaft on the same centerline of rotation as the pump so that the input shaft rotates the pressure compensating load sensing pump;
wherein the input shaft extends through the pump and the pressure compensating load sensing auxiliary pump to a power take-off shaft to provide through power to the power take-off shaft; wherein a transmission housing encases the pump, motor and auxiliary pump; and
wherein the power take-off shaft extends from within the transmission housing to outside the transmission housing.

2. The hydrostatic transmission of claim 1 further comprising an output shaft rotatably connected to the motor so that the motor rotates the output shaft and a differential operably connected to the output shaft.

3. The hydrostatic transmission of claim 2 further comprising an axle operably connected to the differential.

4. The hydrostatic transmission of claim 3 wherein the differential rotates the axle.

5. The hydrostatic transmission of claim 1 wherein the transmission housing is a tractor transmission housing.

6. Hydrostatic transmission comprising:
a pump having a centerline of rotation;

a motor fluidly connected to the pump via fluid lines within a center section and having a second centerline of rotation;

an input shaft rotatably connected to the pump so that the input shaft rotates the pump;

a pressure compensating load sensing auxiliary pump rotatably connected to the input shaft on the same centerline of rotation as the pump so that the input shaft rotates the pressure compensating load sensing pump;

wherein the auxiliary pump is mounted on the center section adjacent the motor;

wherein the input shaft extends through the pump and the pressure compensating load sensing auxiliary pump to a power take-off shaft to provide through power to the power take-off shaft wherein the power take-off shaft is on the same centerline of rotation as the pump;

wherein a transmission housing encases the pump, motor and auxiliary pump; and wherein the auxiliary pump and motor are mounted on a first side of the center section, the pump is mounted on a second side of the center section, and the input shaft extends from through the pump into the second side of the center section, out of and away from the first side of the center section through the auxiliary pump to the power take-off shaft that is on the same center line of rotation as the pump and extends outside the transmission housing.

* * * * *